(12) United States Patent
Hill et al.

(10) Patent No.: US 12,153,274 B2
(45) Date of Patent: Nov. 26, 2024

(54) FLEXIBLE CABLE MOUNTING SYSTEMS

(71) Applicant: Clearfield, Inc., Minneapolis, MN (US)

(72) Inventors: John P. Hill, Oak Grove, MN (US); Donovan J. Hample, Otsego, MN (US); Brian K. Larson, Andover, MN (US); Randy T. VanHorn, Princeton, MN (US)

(73) Assignee: Clearfield, Inc., Minneapolis, MN (US)

( * ) Notice: Subject to any disclaimer, the term of this patent is extended or adjusted under 35 U.S.C. 154(b) by 0 days.

(21) Appl. No.: 17/734,385

(22) Filed: May 2, 2022

(65) Prior Publication Data

US 2023/0350148 A1 Nov. 2, 2023

(51) Int. Cl.
*G02B 6/44* (2006.01)

(52) U.S. Cl.
CPC ......... *G02B 6/4478* (2013.01); *G02B 6/4459* (2013.01); *G02B 6/4471* (2013.01); *G02B 6/44715* (2023.05)

(58) Field of Classification Search
CPC .. G02B 6/4471; G02B 6/4459; G02B 6/4478; G02B 6/38875; G02B 6/3829; G02B 6/44715; G02B 6/4472; G02B 6/44765; G02B 6/4477; G02B 6/3887; G02B 6/3897; G02B 6/3878; G02B 6/3888; H02G 11/00; H02G 11/006; H02G 3/0608; H02G 3/06; H02G 15/007
See application file for complete search history.

(56) References Cited

U.S. PATENT DOCUMENTS

| | | | | |
|---|---|---|---|---|
| 5,710,851 A | * | 1/1998 | Walter ............... | G02B 6/38875 385/100 |
| 6,618,540 B2 | * | 9/2003 | Wu ....................... | G02B 6/3616 385/137 |
| 7,798,762 B2 | * | 9/2010 | Baba ...................... | B21D 43/05 100/207 |
| 8,576,676 B2 | * | 11/2013 | Kim ...................... | H05K 1/0281 360/264.2 |
| 10,665,368 B2 | * | 5/2020 | Doye ..................... | H01B 17/14 |

(Continued)

FOREIGN PATENT DOCUMENTS

| | | | | | |
|---|---|---|---|---|---|
| CA | 3014819 C | * | 1/2021 | .......... | H02G 3/0608 |
| CN | 103016620 A | * | 4/2013 | ............. | F16G 13/16 |

(Continued)

OTHER PUBLICATIONS

Pfluger G., Machine Translation of EP-2485351-A1, Aug. 8, 2012. (Year: 2012).*

*Primary Examiner* — Michelle R Connelly
(74) *Attorney, Agent, or Firm* — Troutman Pepper Hamilton Sanders LLP; Alison L. McCarthy; Mark Lehi Jones

(57) ABSTRACT

A flexible cable mounting system has one or more brackets. The flexible cable mounting system has an elongated surface affixed to the one or more brackets and configured to guide one or more cables generally parallel along the elongated surface. The elongated surface has a first portion having a generally linear profile. The elongated surface has a second portion having a generally linear profile. The elongated surface has a third portion disposed between the first portion and the second portion. The third portion is flexibly configured to vary an angle formed between the first portion relative to the second portion.

9 Claims, 15 Drawing Sheets

(56) References Cited

U.S. PATENT DOCUMENTS

| | | | | |
|---|---|---|---|---|
| 2002/0113434 A1* | 8/2002 | Tresch | ................ | G02B 6/4459 |
| | | | | 285/260 |
| 2008/0131070 A1* | 6/2008 | Zellak | .................... | H02G 11/00 |
| | | | | 385/137 |
| 2013/0034334 A1* | 2/2013 | Fariello | ................ | H05K 7/1491 |
| | | | | 248/274.1 |
| 2013/0341471 A1* | 12/2013 | Yang | .................... | H05K 7/1491 |
| | | | | 248/65 |
| 2015/0331217 A1* | 11/2015 | Kaplan | ................ | G02B 6/4466 |
| | | | | 385/135 |
| 2016/0309612 A1* | 10/2016 | Yi | ....................... | H05K 7/1491 |

FOREIGN PATENT DOCUMENTS

| | | | | | |
|---|---|---|---|---|---|
| DE | 3107045 | A | * | 9/1982 | ............. F16L 3/015 |
| DE | 102016102351 | A1 | * | 8/2017 | |
| EP | 578459 | A1 | * | 1/1994 | ........... H02G 3/0608 |
| EP | 2485351 | A1 | * | 8/2012 | ........... H02G 3/0437 |
| EP | 2884609 | A1 | * | 6/2015 | ........... H02G 3/0608 |

* cited by examiner

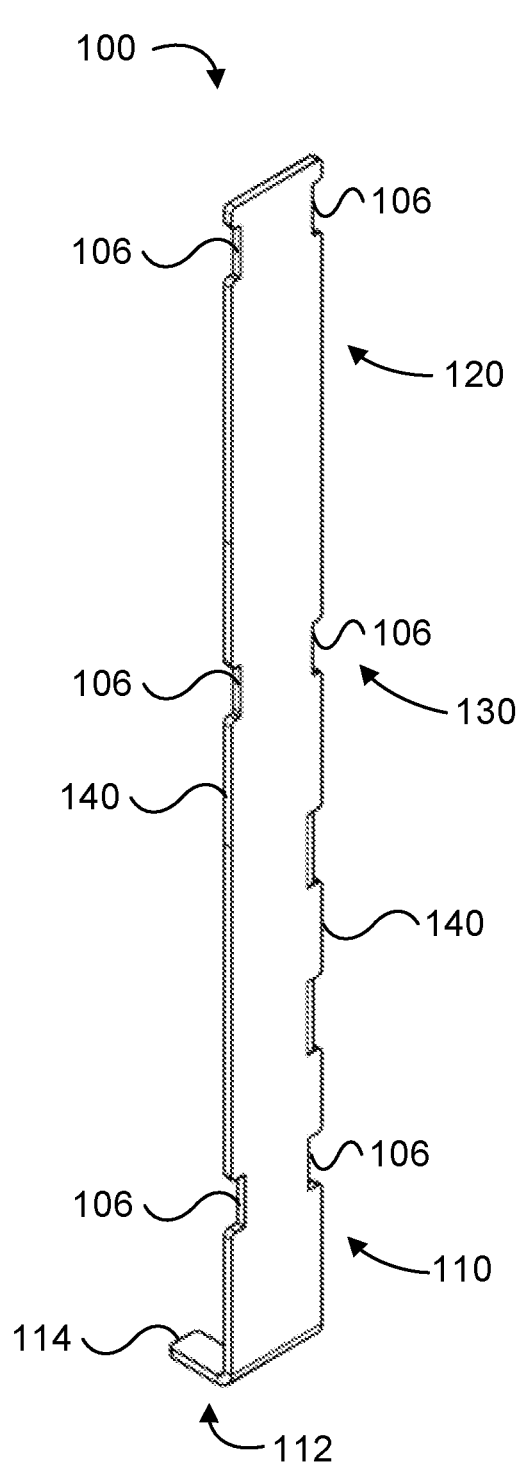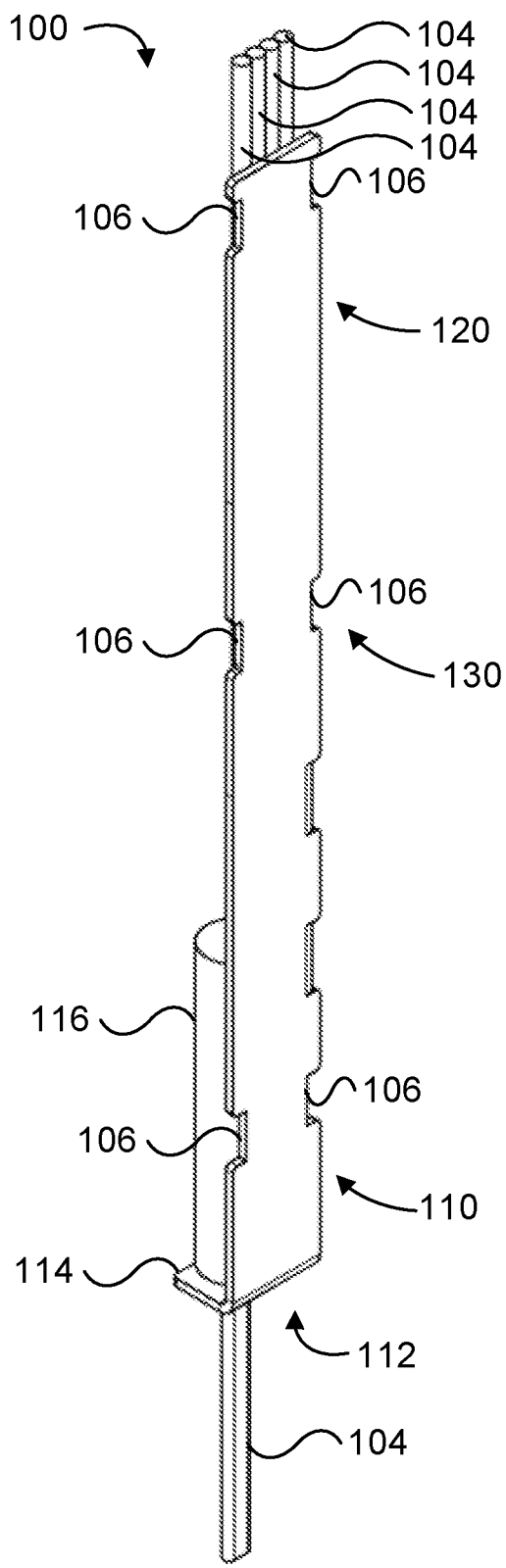
FIG. 4A
FIG. 4B

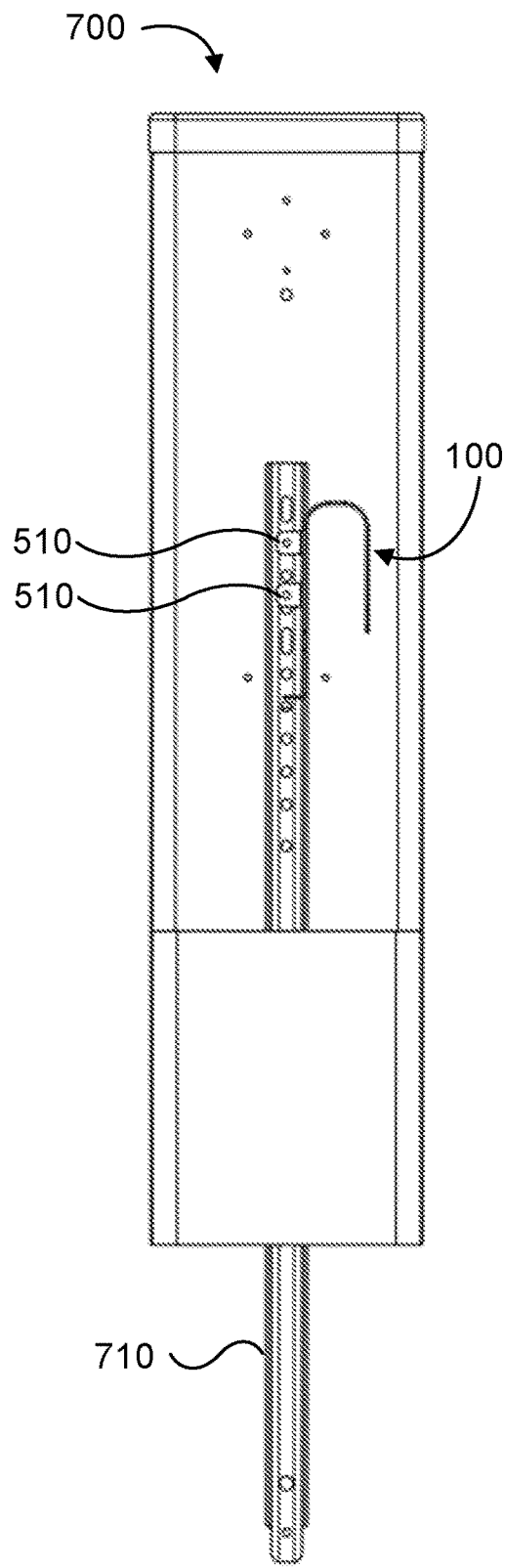# 
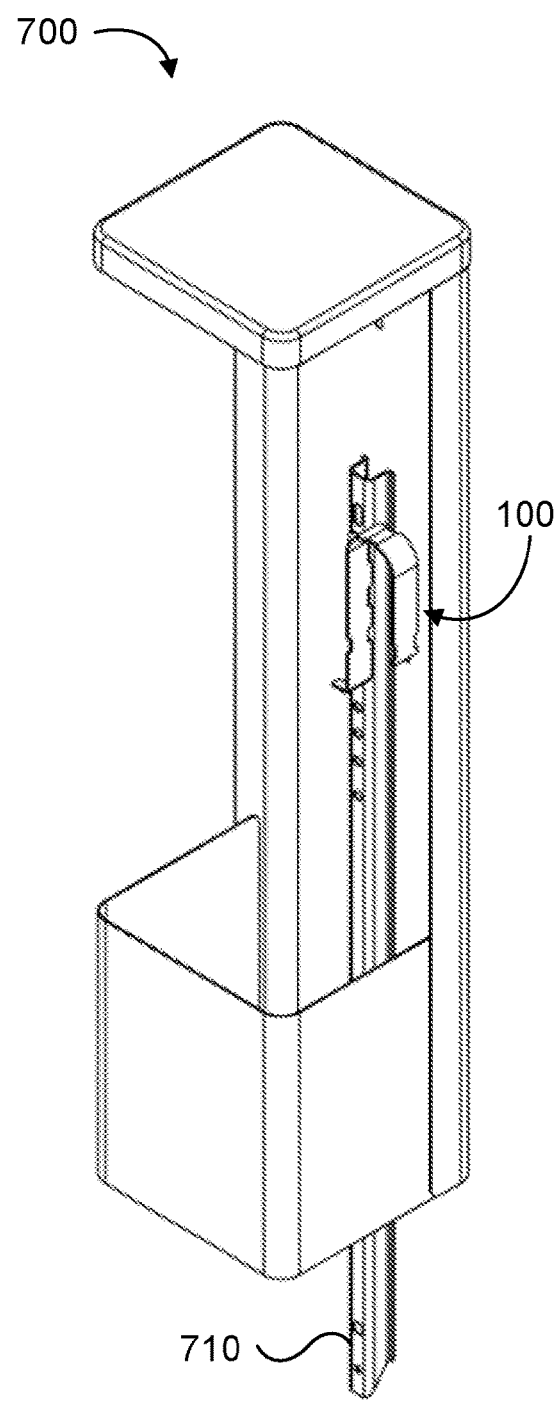
FIG. 7A  FIG. 7B

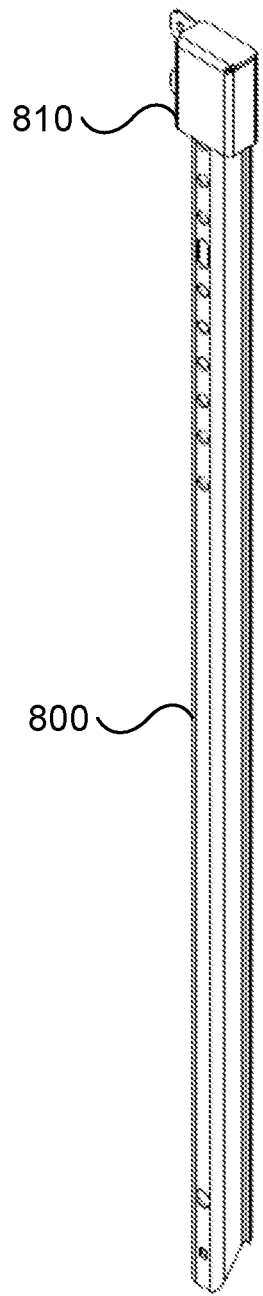
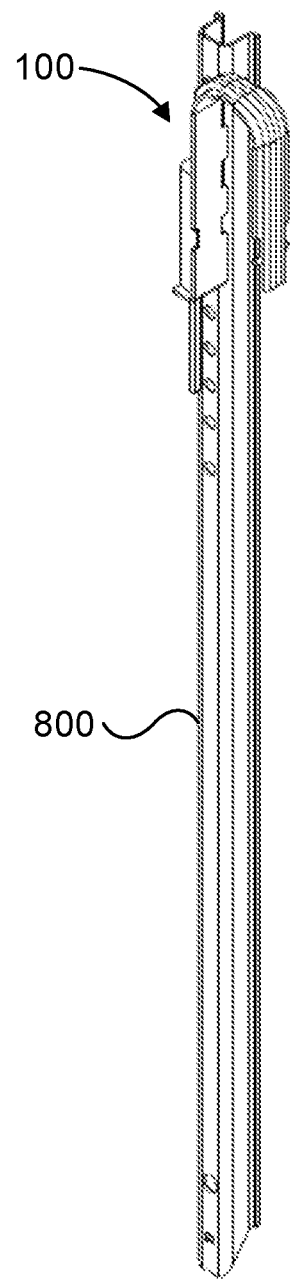
FIG. 8C
FIG. 8D

FLEXIBLE CABLE MOUNTING SYSTEMS

FIELD OF THE DISCLOSURE

The present disclosure relates generally to cable mounting systems and more particularly to flexible cable mounting systems.

BACKGROUND

Data, voice, and other communication networks are increasingly using fiber optics to carry information. In a fiber optic network, each individual fiber is generally connected to both a source and a destination device. Additionally, along the fiber optic run between the source and the destination, various connections or couplings may be made on the optical fiber to adjust the length of the fiber or to provide termination connection ports for end users at which one or more fibers may be branched from a feed cable. Providing the cable with a predictive path along the fiber optic run is needed.

Cable deployment can use both new and existing infrastructure along the fiber optic run. Further, the infrastructure can have varying installation requirements for the cable path. Because of this, there is a need for modularity when mounting cable to create a predictive path for the installed cable. For example, cable terminating in ground boxes may need to make a 180 degree turn. Alternatively, install requirements and/or field conditions might require cable to make a different degree turn, such as 90 degrees turn. As such, cable mounting systems with a predetermined path may not provide the necessary modularity to effectively provide predictive paths for cable installed in the varying install requirements and/or field conditions along the fiber optic run. Accordingly, there is a need for flexible, customizable cable mounting systems that can provide a predictive path for cable to meet varying install requirements and/or field conditions along the fiber optic run.

SUMMARY

According to one aspect, the present disclosure is directed to a flexible cable mounting system. The flexible cable mounting system can include one or more brackets. The flexible cable mounting system can include an elongated surface affixed to the one or more brackets. The elongated surface can be configured to guide one or more cables generally parallel along the elongated surface. The elongated surface can include a first portion having a generally linear profile: a second portion having a generally linear profile; and a third portion disposed between the first portion and the second portion. The third portion can be flexibly configured to vary an angle formed between the first portion relative to the second portion.

The third portion can be flexibly configured to vary the angle formed between the first portion relative to the second portion by generally forming an arc therebetween.

The third portion can be flexibly configured to vary the angle between the first portion and the second portion from 0 degrees to 180 degrees and any angle therebetween.

The third portion can further include a first flexible portion. The first flexible portion can be configured to flexibly bend between a generally linear profile and a 90-degree arc profile and any degree arc profile therebetween. The third portion further can include a second flexible portion. The second flexible portion can be configured to flexibly bend between a generally linear profile and a 90-degree arc profile and any degree arc profile therebetween. The third portion further can include a connecting portion. The connecting portion can have a generally linear profile. The connecting portion can be disposed between the first flexible portion and the second flexible portion.

The flexible cable mounting system can include a first plurality of notches disposed along a first exterior edge of the elongated surface. The flexible cable mounting system can include a second plurality of notches disposed along a second exterior edge of the elongated surface. The first exterior edge can be an opposite side to the second exterior edge. The first plurality of notches can mirror the second plurality of notches along a parallel centerline as between the first exterior edge and the second exterior edge.

The one or more brackets can be configured to mount the system in an optical fiber enclosure.

According to another aspect, the present disclosure is directed to a flexible cable mounting system. The flexible cable mounting system can include one or more brackets. The flexible cable mounting system can include an elongated surface affixed to the one or more brackets. The elongated surface can be configured to guide one or more cables generally parallel along the elongated surface. The elongated surface can include a first portion having a generally linear profile: a second portion having a generally linear profile; and a third portion disposed between the first portion and the second portion. The third portion can be flexibly configured to vary an angle formed between the first portion relative to the second portion. The third portion can include a first flexible portion. The first flexible portion can be configured to flexibly bend between a generally linear profile and a 90-degree arc profile and any degree arc profile therebetween. The third portion can include a second flexible portion. The second flexible portion can be configured to flexibly bend between a generally linear profile and a 90-degree arc profile and any degree arc profile therebetween. The third portion can include a connecting portion having a generally linear profile. The connecting portion can be disposed between the first flexible portion and the second flexible portion.

The third portion can be flexibly configured to vary the angle between the first portion and the second portion from 0 degrees to 180 degrees and any angle therebetween.

The flexible cable mounting system can include a first plurality of notches disposed along a first exterior edge of the elongated surface. The flexible cable mounting system can include a second plurality of notches disposed along a second exterior edge of the elongated surface. The first exterior edge can be an opposite side to the second exterior edge. The first plurality of notches can mirror the second plurality of notches along a parallel centerline as between the first exterior edge and the second exterior edge.

The one or more brackets can be configured to mount the system in an optical fiber enclosure.

According to another aspect, the present disclosure is directed to a flexible cable mounting system. The flexible cable mounting system can include one or more brackets. The flexible cable mounting system can include an elongated surface affixed to the one or more brackets. The elongated surface can be configured to guide one or more cables generally parallel along the elongated surface. The elongated surface can include a first portion having a generally linear profile: a second portion having a generally linear profile; and a third portion disposed between the first portion and the second portion. The third portion can be flexibly configured to vary an angle formed between the first portion relative to the second portion. The elongated surface can include a first plurality of notches disposed along a first exterior edge of the elongated surface. The elongated surface can include a second plurality of notches disposed along a second exterior edge of the elongated surface. The first exterior edge can be an opposite side to the second exterior edge. The first plurality of notches can mirror the second plurality of notches along a parallel centerline as between the first exterior edge and the second exterior edge.

The third portion is flexibly can be configured to vary the angle formed between the first portion relative to the second portion by generally forming an arc therebetween.

The third portion can be flexibly configured to vary the angle between the first portion and the second portion from 0 degrees to 180 degrees and any angle therebetween.

The third portion can further include a first flexible portion. The first flexible portion can be configured to flexibly bend between a generally linear profile and a 90-degree arc profile and any degree arc profile therebetween. The third portion further can include a second flexible portion. The second flexible portion can be configured to flexibly bend between a generally linear profile and a 90-degree arc profile and any degree arc profile therebetween. The third portion further can include a connecting portion. The connecting portion can have a generally linear profile. The connecting portion can be disposed between the first flexible portion and the second flexible portion.

The one or more brackets can be configured to mount the system in an optical fiber enclosure.

BRIEF DESCRIPTION OF THE DRAWINGS

FIG. 4A provides a perspective view of an example flexible cable mounting system, in accordance with the present disclosure.

FIG. 4B provides a perspective view of an example flexible cable mounting system, in accordance with the present disclosure.

FIG. 7A provides a side, partially disassembled view of the example terminal, in accordance with the present disclosure.

FIG. 7B provides a perspective, partially disassembled view of the example terminal, in accordance with the present disclosure.

FIG. 8C provides a perspective view of an example terminal, in accordance with the present disclosure.

FIG. 8D provides a perspective view of an example terminal, in accordance with the present disclosure.

DETAILED DESCRIPTION

Aspects of the present disclosure are directed to flexible cable mounting systems. While the disclosed technology is described throughout this disclosure in relation to optical fiber, those having skill in the art will recognize that the disclosed technology is not so limited and can be applicable to other scenarios and applications. For example, embodiments of the flexible cable mounting systems may be configured to accept a variety of cables including optical fiber, coaxial, twisted pair, as nonlimiting examples. Various embodiments of cable mounting systems disclosed herein simplify fiber deployment and other functions, such as by enabling easier installation and routing of cables through the flexible cable mounting system. For example, the flexible cable mounting system can be adjusted as needed to vary the path provided by the system to the cable mounted thereon.

Figure 1A:
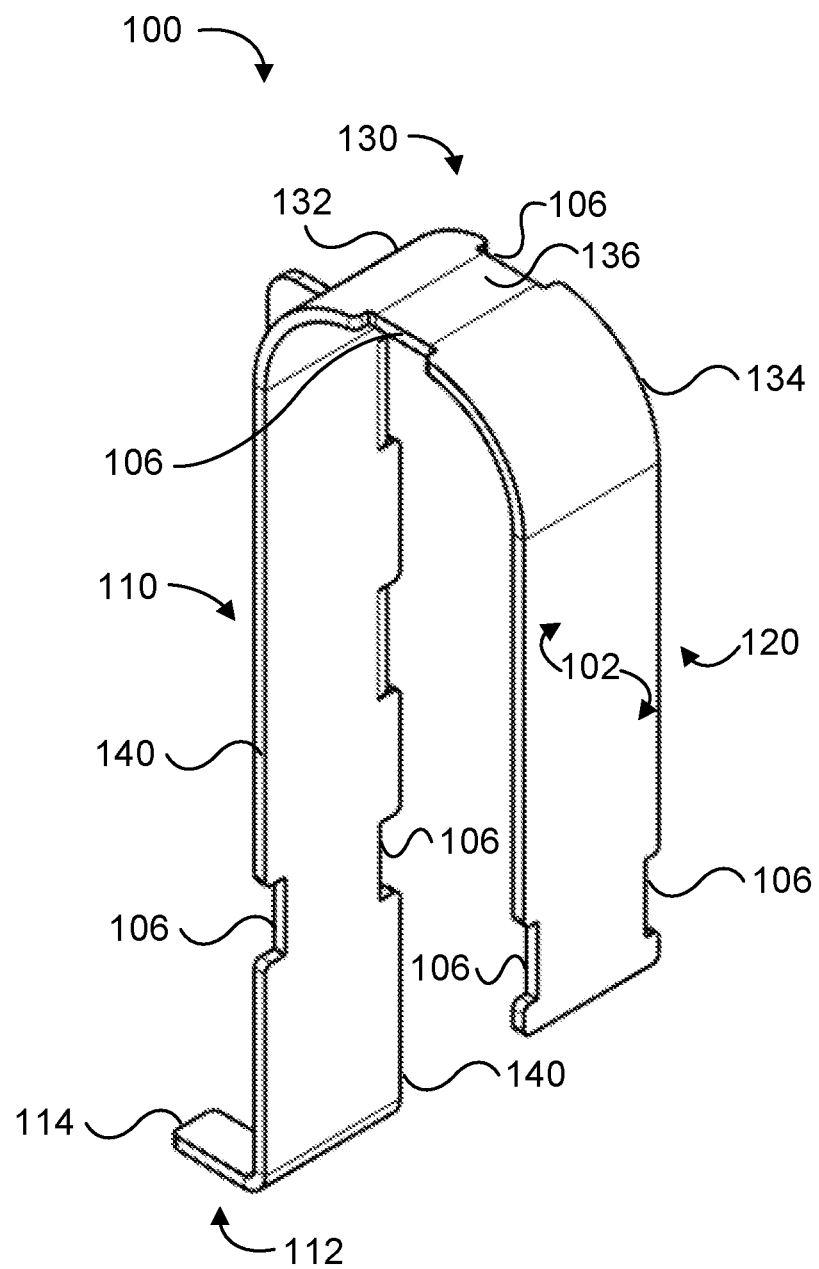
FIG. 1A provides a perspective view of an example flexible cable mounting system, in accordance with the present disclosure.
Figure 1B:
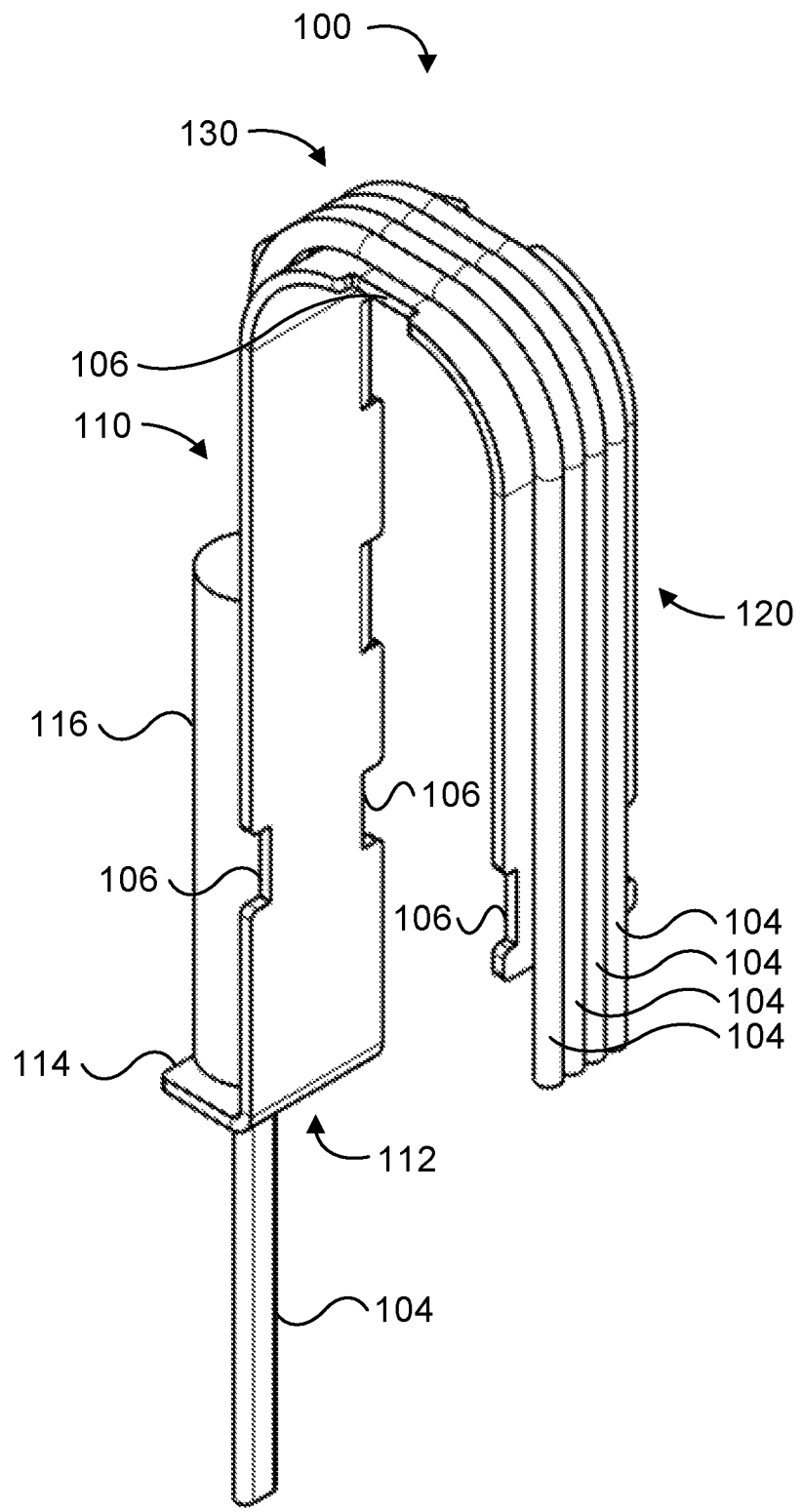
FIG. 1B provides a perspective view of an example flexible cable mounting system, in accordance with the present disclosure.

FIGS. 1A and 1B show one embodiment of a flexible cable mounting system 100. The flexible cable mounting system 100 includes an elongated surface 102 by which the path of one or more cables 104 can be guided, as explained more fully herein. The flexible cable mounting system 100 includes a first portion 110, a second portion 120, and a third portion 130. At least the third portion 130 can be configured to be flexible such that the third portion 130 can be manipulated to vary the angle between the first portion 110 and the second portion 120, as explained more fully herein. For example, the flexible cable mounting system 100 can be adjusted to create a predictive path for routing cable 104 by flexibly adjusting the third portion 130 to create a path with an angled turn. The path can be adjusted as needed to meet varying installation requirements and/or field conditions where cable is being routed.

As illustrated in FIG. 1B, the flexible cable mounting system 100 can guide one or more cables 104 such that the cables 104 generally follow the path formed by the flexible cable mounting system 100. For example, the one or more cables 104 can be disposed adjacent to an elongated surface 102 of the flexible cable mounting system 100. The elongated surface 102 can be a continuous surface of the first portion 110, second portion 120, and third portion 130 and can support and/or guide the cables along the length of the flexible cable mounting system 100. The cables 104 can be secured to portions of the flexible cable mounting system 100 by cable securing systems (e.g., cable ties, twist ties, rubber band, etc.).

The flexible cable mounting system 100 can include a plurality of notches 106 disposed along the exterior edge 140 of the first portion 110, second portion 120, and third portion 130. For example, as illustrated in FIGS. 1A and 1B, pairs of notches 106 can be disposed opposite one another along the exterior edges 140 (e.g., mirrored about the centerline between the exterior edges 140). Cable securing system (e.g., cable ties, twist ties, rubber band, etc.) can be disposed in the notches 106 to help secure the one or more cables 104 to the elongated surface 102 by preventing the securing system from sliding along the elongated surface outside of the notches 106.

The first portion 110 can include a first end 112. The first end 112 can receive one or more cables 104 for routing along the path formed by the flexible cable mounting system 100. The first end 112 can include an angled termination 114. For example, as illustrated in FIGS. 1A and 1B, the angled termination 114 can be a L-shaped termination. The angled termination 114 can be the width of the first portion 110 and can include a hole and/or a gap in the middle to allow one or more cables 104 can pass through. For example, the angled termination 114 can be formed by two L-shaped terminations disposed at the exterior edges 140 of the elongated surface and having a gap in-between.

The first portion 110 and the second portion 120 can be generally linear. For example, the first portion 110 and the second portion 120 can be generally linear in shape such that the elongated surface 102 along those portions is generally linear. The first portion 110 and the second portion 120 can be constructed with a substantially rigid material. For example, the first portion 110 and second portion 120 can be constructed with any substantially rigid material known in the art, including, without limitation, plastic, metal, foam, and the like, or any combination thereof.

Figure 2A:
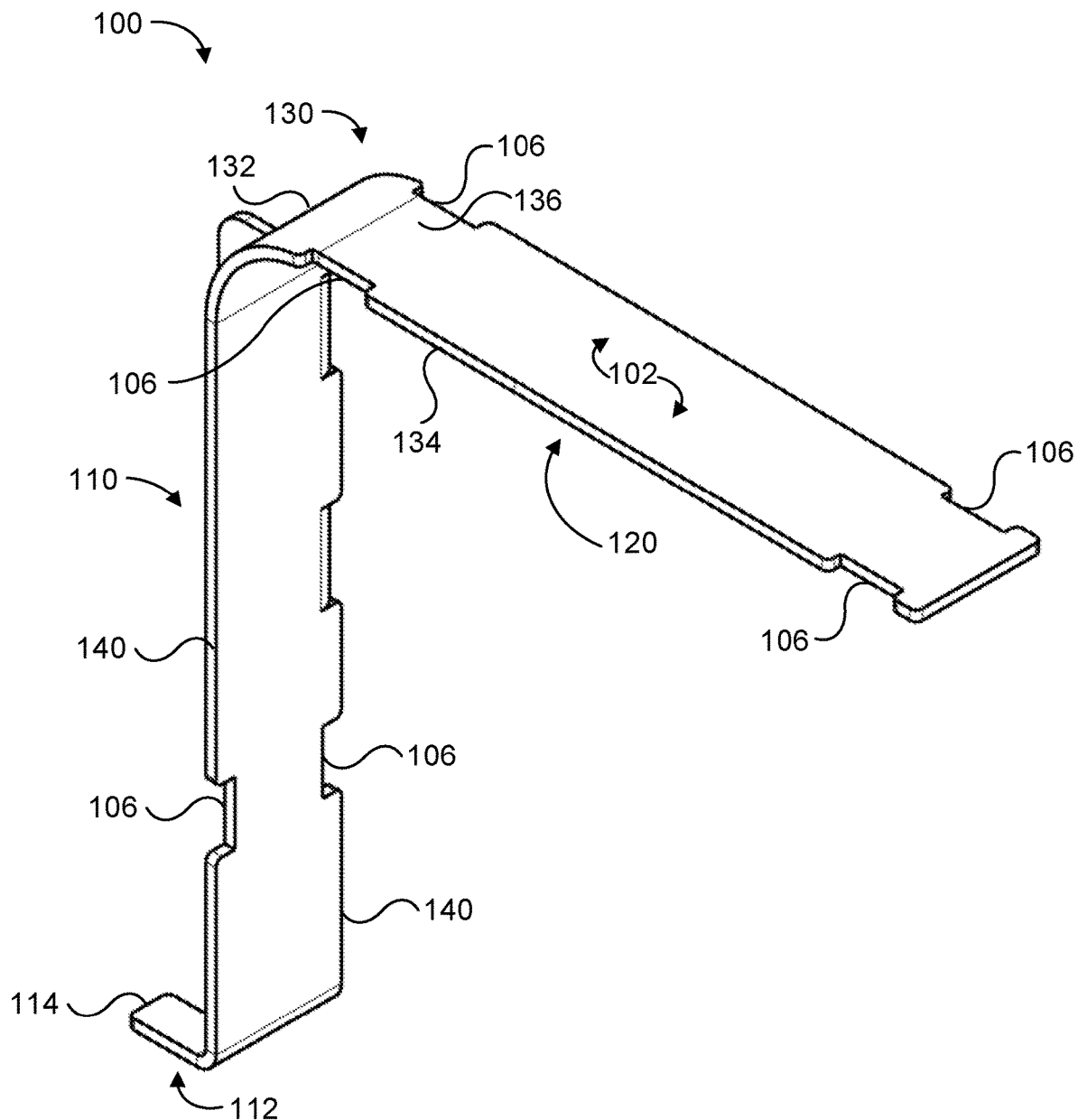
FIG. 2A provides a perspective view of an example flexible cable mounting system, in accordance with the present disclosure.
Figure 2B:
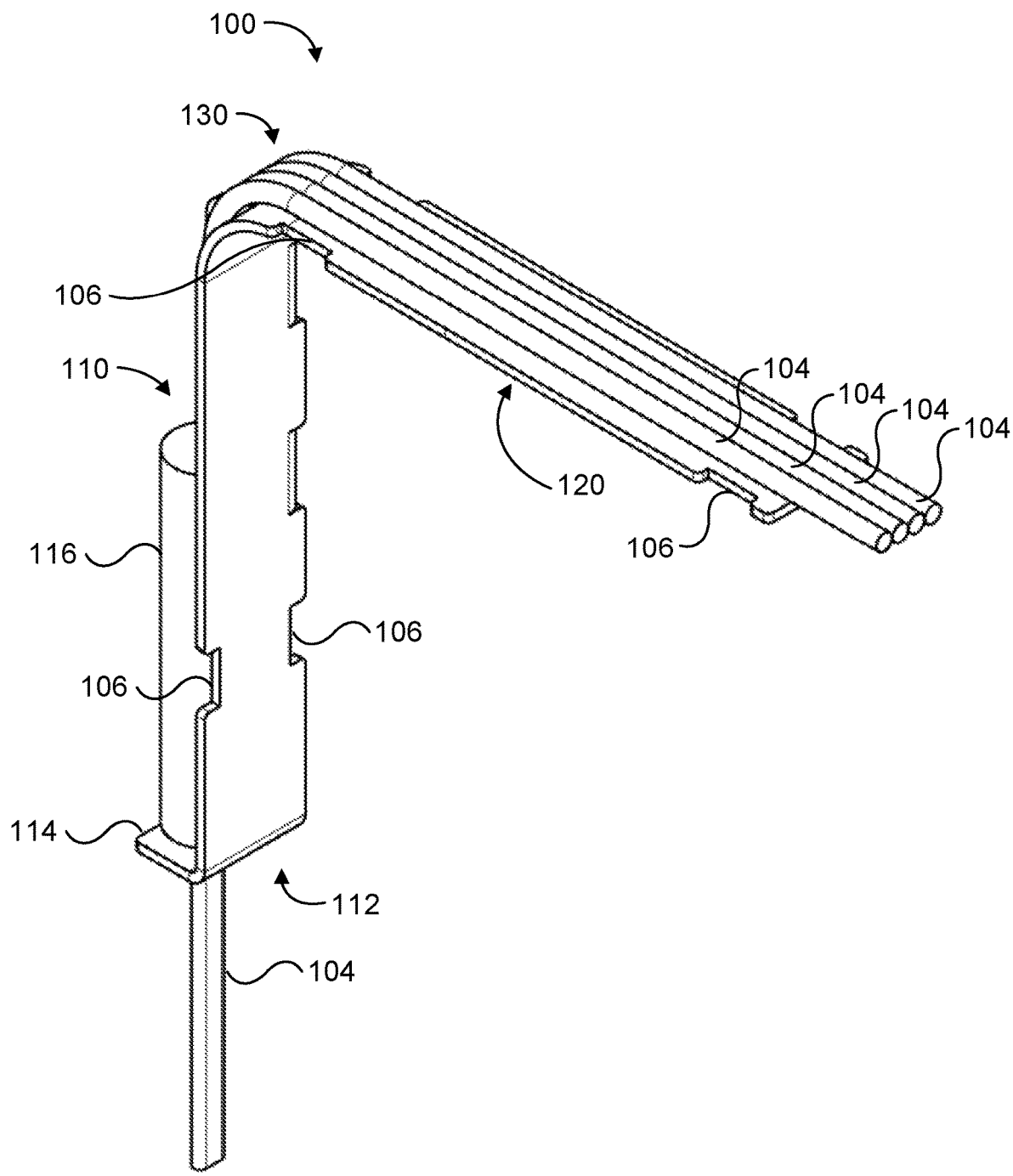
FIG. 2B provides a perspective view of an example flexible cable mounting system, in accordance with the present disclosure.
Figure 3A:
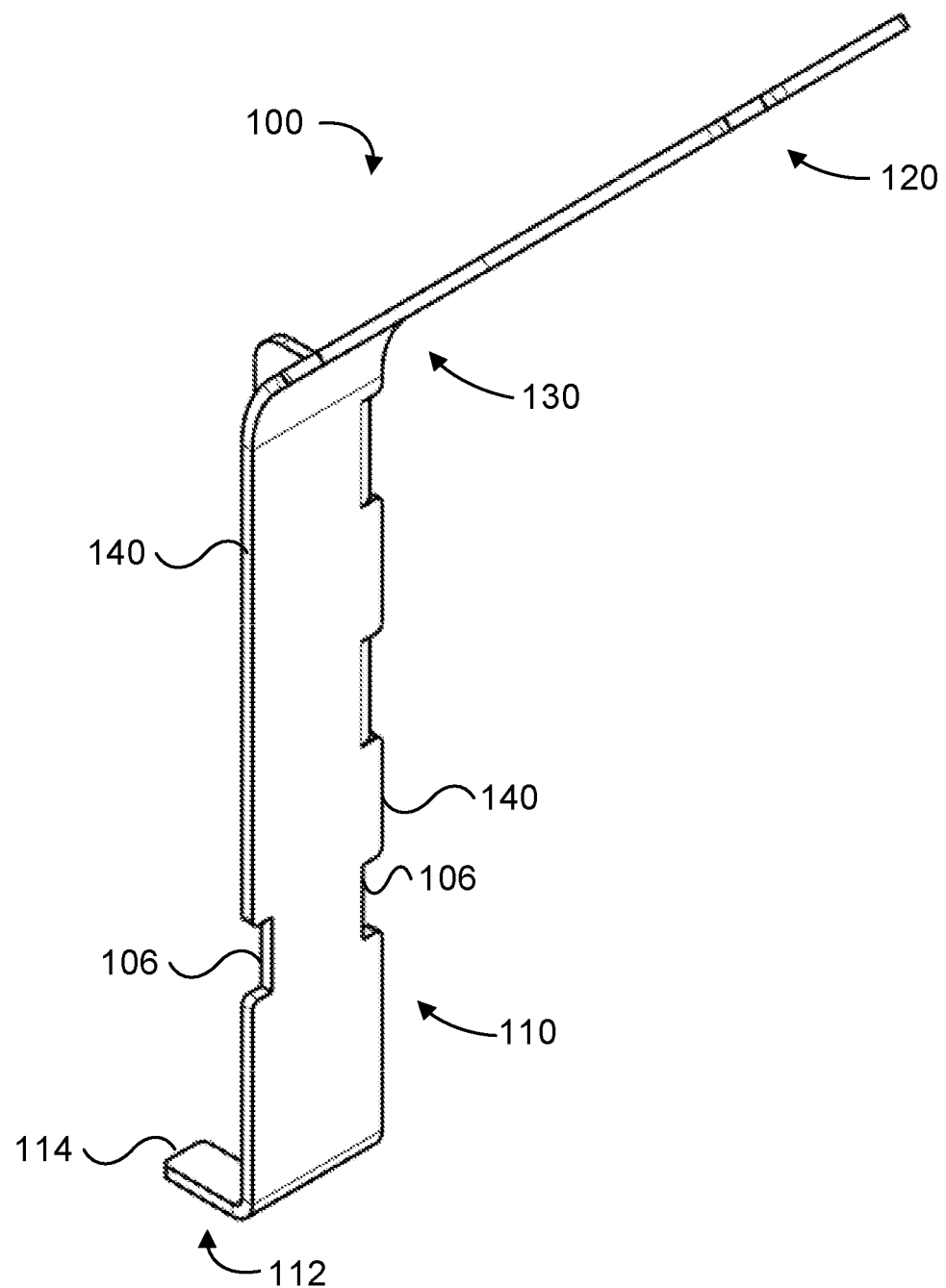
FIG. 3A provides a perspective view of an example flexible cable mounting system, in accordance with the present disclosure.
Figure 3B:
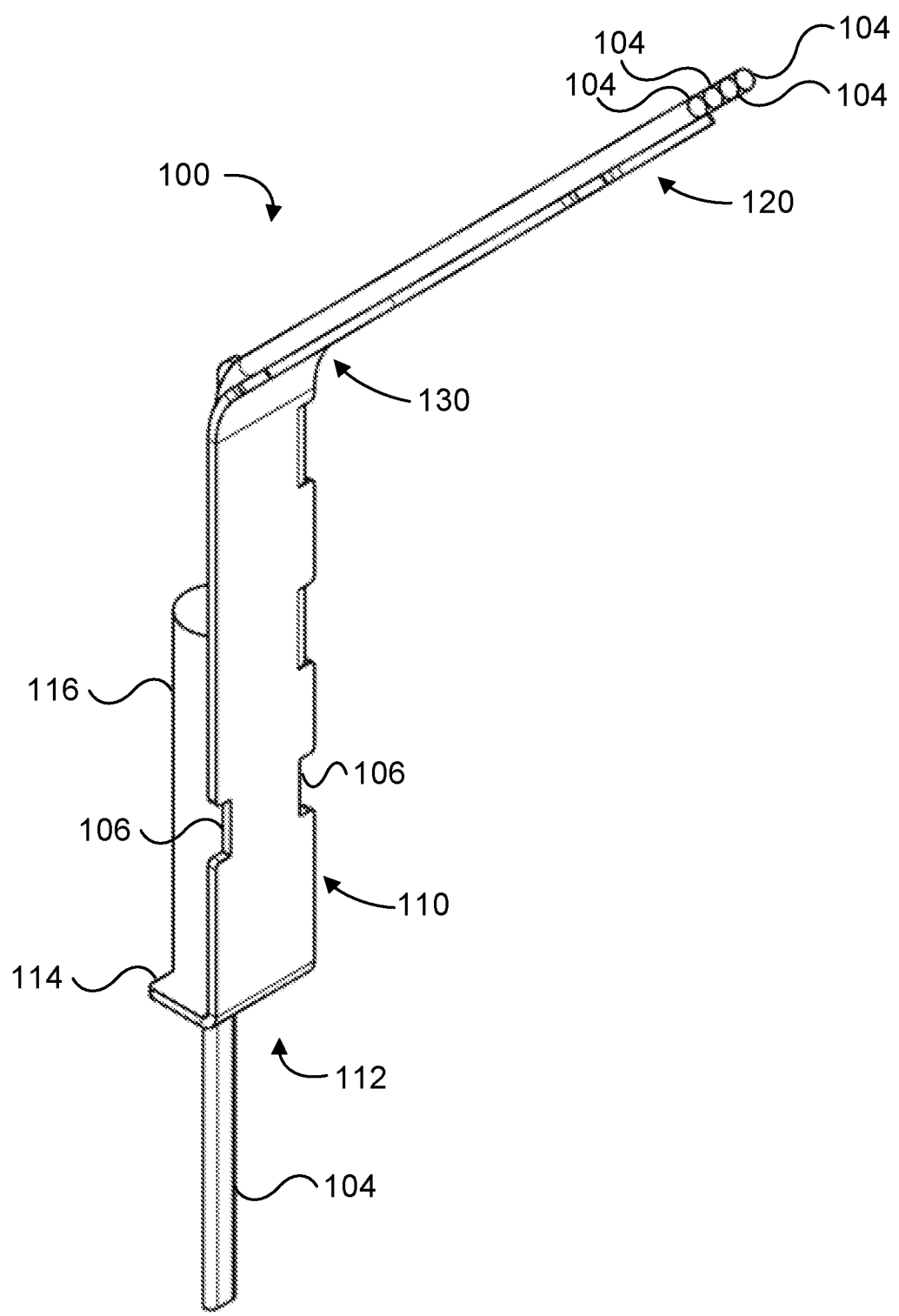
FIG. 3B provides a perspective view of an example flexible cable mounting system, in accordance with the present disclosure.
Figure 5A:
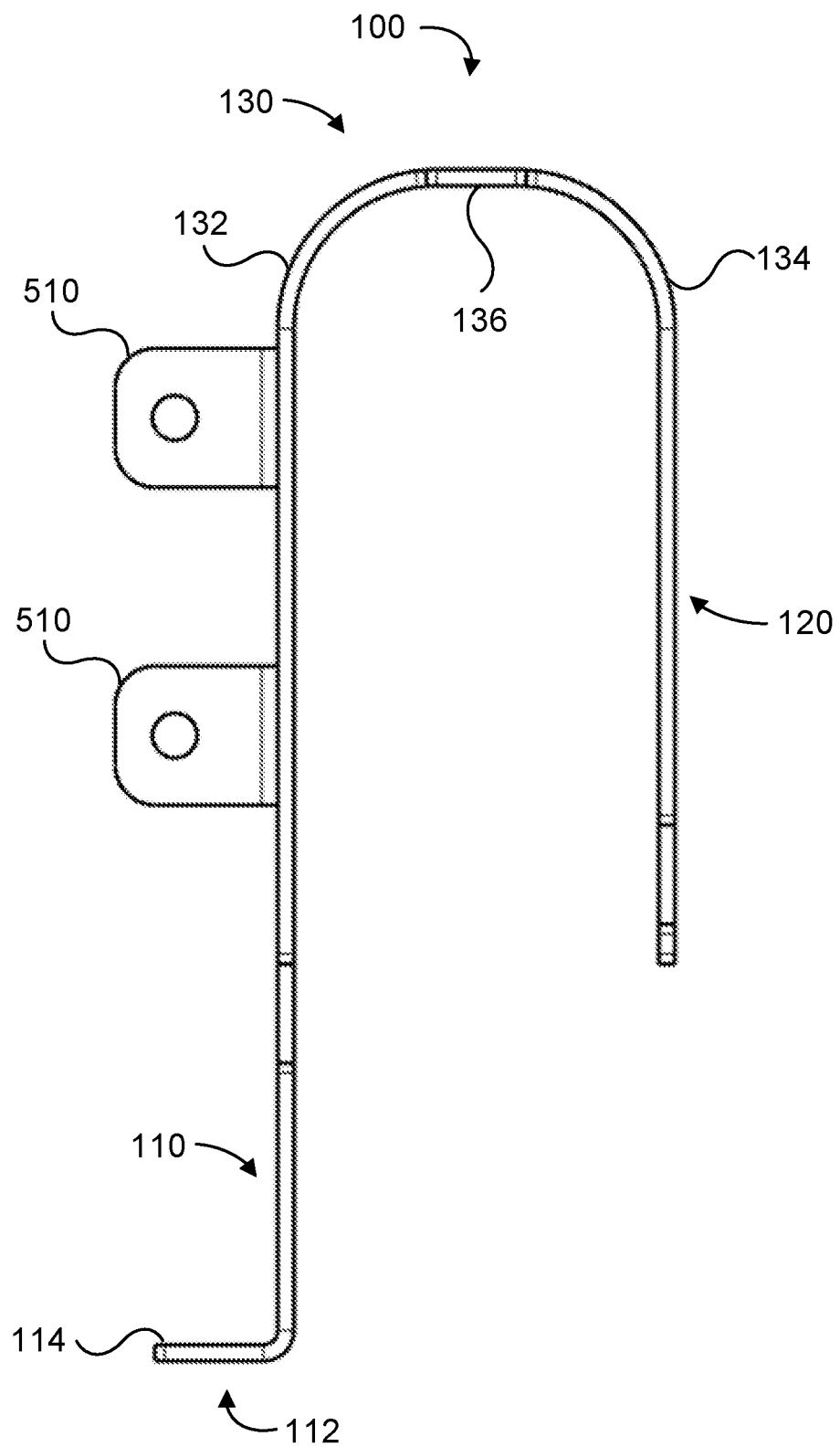
FIG. 5A provides a side view of an example flexible cable mounting system, in accordance with the present disclosure.
Figure 5B:
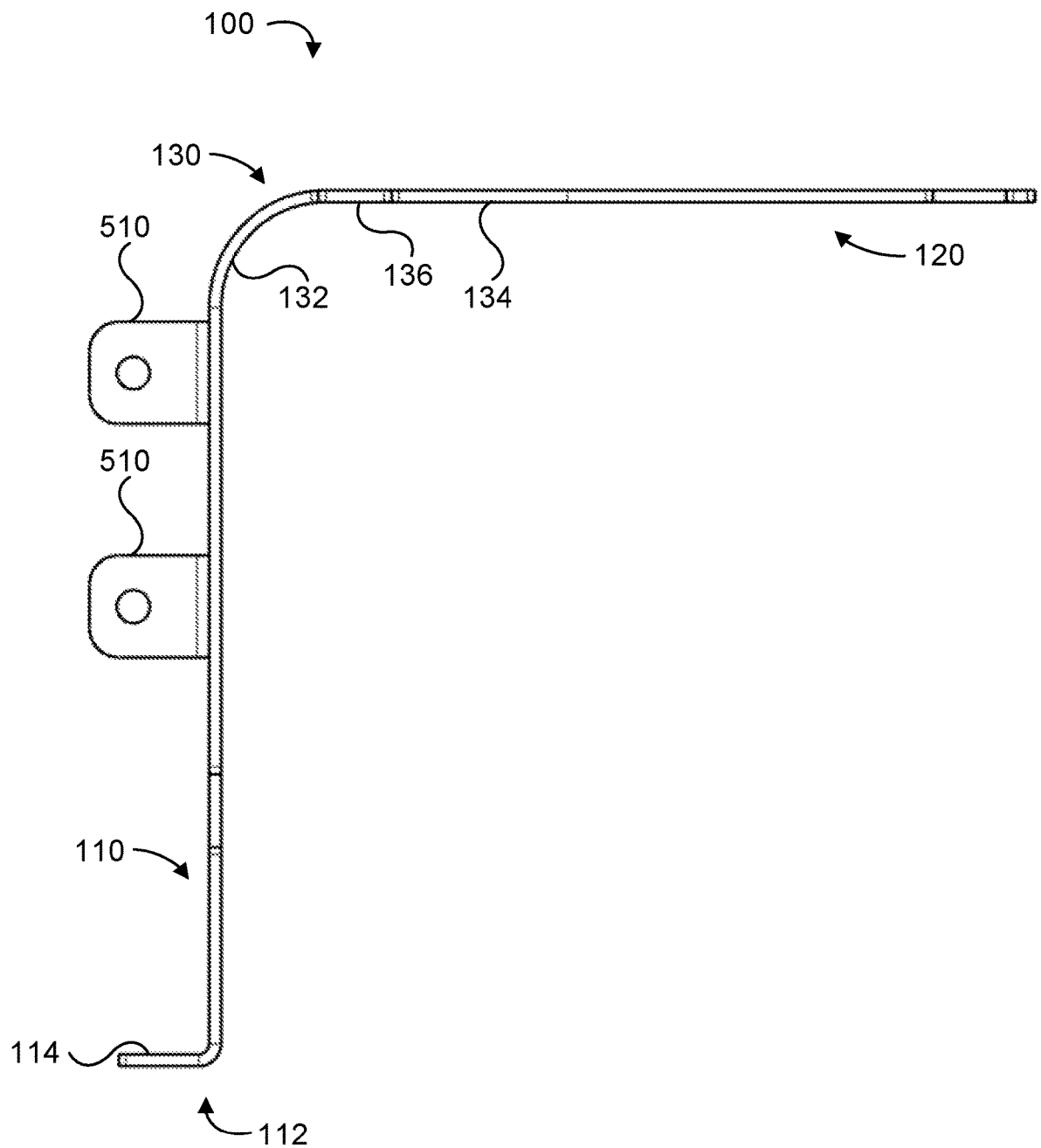
FIG. 5B provides a side view of an example flexible cable mounting system, in accordance with the present disclosure.
Figure 5C:
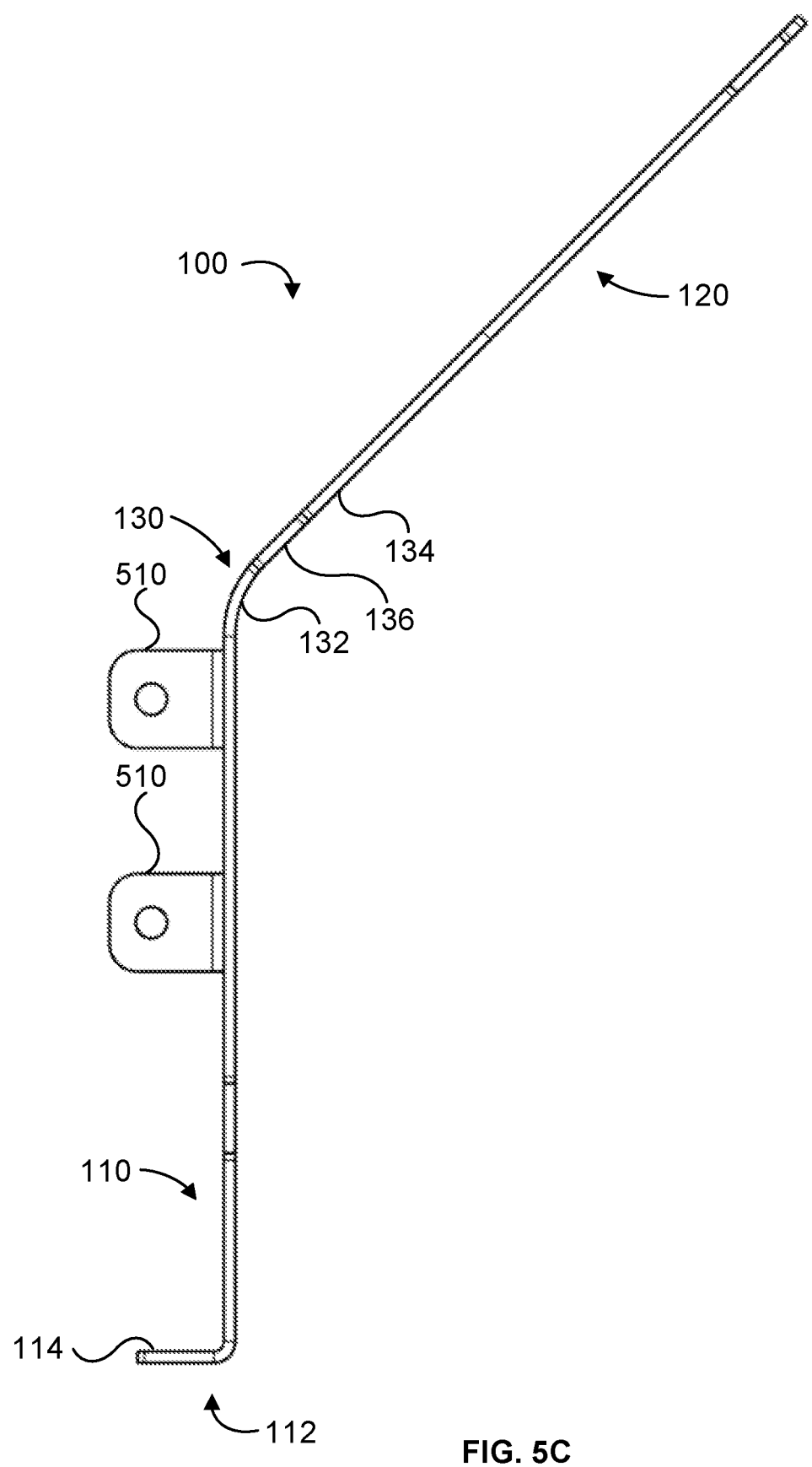
FIG. 5C provides a side view of an example flexible cable mounting system, in accordance with the present disclosure.

The flexible cable mounting system 100 can be configured to create a varying path for routing cable. For example, the third portion 130 can be configured to vary the angle between the first portion 110 and the second portion 120 from 0 degrees to 180 degrees and any angle therebetween to form a path for routing cable. Various, nonlimiting configurations of the flexible cable mounting system 100 are illustrated in FIGS. 1A-5B. For example, as illustrated in FIGS. 1A, 1B, and 5A, the flexible cable mounting system 100 can be set to form a path with a 180 degree turn. As illustrated in FIGS. 2A, 2B, and 5B, the flexible cable mounting system 100 can be set to form a path with a 90 degree turn. As illustrated in FIGS. 3A, 3B, and 5C, the flexible cable mounting system 100 can be set to form a path with a 45 degree turn. As illustrated in FIGS. 4A and 4B, the flexible cable mounting system 100 can be set to form a path with a 0 degree turn.

The third portion 130 can include one or more flexible portions configured to be flexibly deformable. The flexible portion can be constructed with a flexible material that allows the portion to deform without a significant loss of structural integrity. For example, the flexible portion can be constructed with any flexible material known in the art, including, without limitation, plastic, metal, foam, and the like, or any combination thereof. The flexible portion can be configured to deform to form a curved angle, such as an arc of a circle. The flexible portion can be constructed with a flexible material that allows the portion to deform repeatedly between a variety of configurations (e.g., 180 degree turn, 90 degree turn, 0 degree turn) without a significant loss of structural integrity.

The third portion 130 can include a first flexible portion 132, a second flexible portion 134, and a connecting portion 136. For example, the first flexible portion 132 and second flexible portion 134 can be configured to each flexibly bend between a generally linear profile and a 90-degree arc profile and any degree arc profile therebetween. As such, the third portion 130 can create a generally arced turn of any angle between 0 degrees and 180 degrees. The connecting portion 136 can be disposed between the first flexible portion 132 and second flexible portion 134. The connecting portion 136 can be generally linear and constructed with a substantially rigid material. For example, the connecting portion 136 can be the same material as the first portion 110 and the second portion 120.

In some embodiments, the one or more cables 104 may be configured to be split. For example, as illustrated in FIG. 1B, a cable 104 can be routed into the first end 112 and split into four cables 104. The flexible cable mounting system 100 can include a splitter 116 for splitting the one or more cables 104. The splitter 116 can be configured to have a split ratio of 1:4 as illustrated in FIG. 1B. Alternatively, or in addition, the flexible cable mounting system 100 can be configured to receive different types of splitters having different split ratios. As illustrated in FIG. 1B, the splitter 116 can be disposed at the first portion 110. In addition, the splitter 116 can be attached or supported, at least in part, by the angled termination 114.

The flexible cable mounting system 100 can include one or more brackets 510. As illustrated in FIGS. 5A-5C, the flexible cable mounting system 100 can include two brackets 510. The brackets 510 can be configured to attach the flexible cable mounting system 100 to cable routing infrastructure. For example, the brackets 510 can be used to attach the flexible cable mounting system 100 by screws, bolts, nails, etc., that pass through a hole in the bracket 510 to a piece of cable routing infrastructure.

Figure 6A:
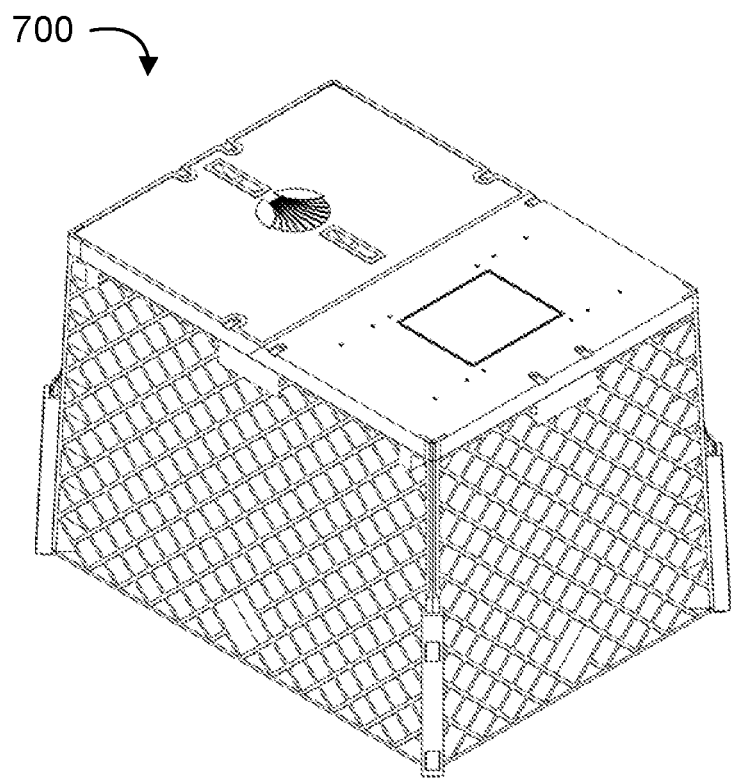
FIG. 6A provides a perspective view of an example terminal, in accordance with the present disclosure.
Figure 6B:
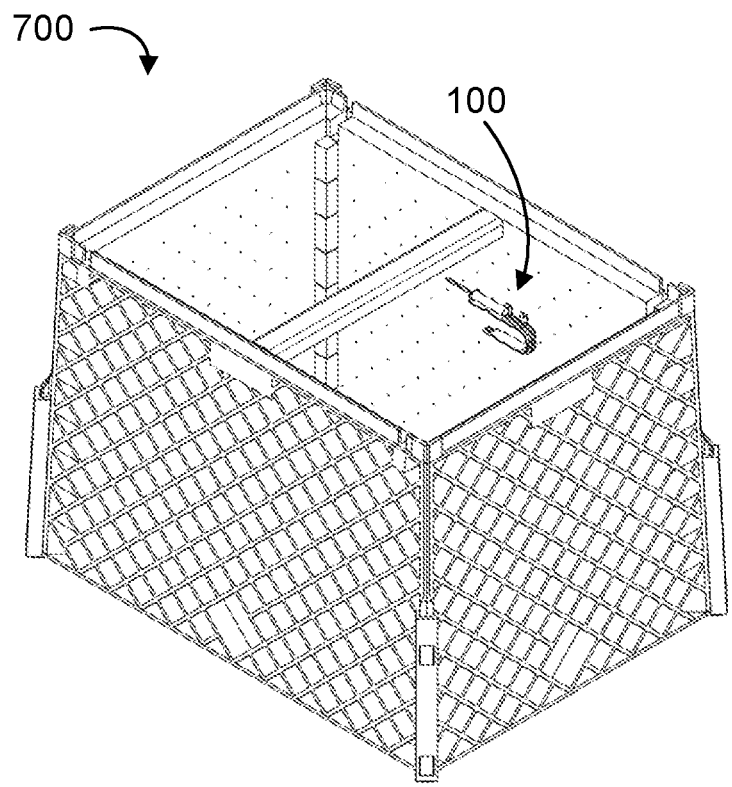
FIG. 6B provides a perspective, partially disassembled view of the example terminal of FIG. 6A, in accordance with the present disclosure.
Figure 6C:
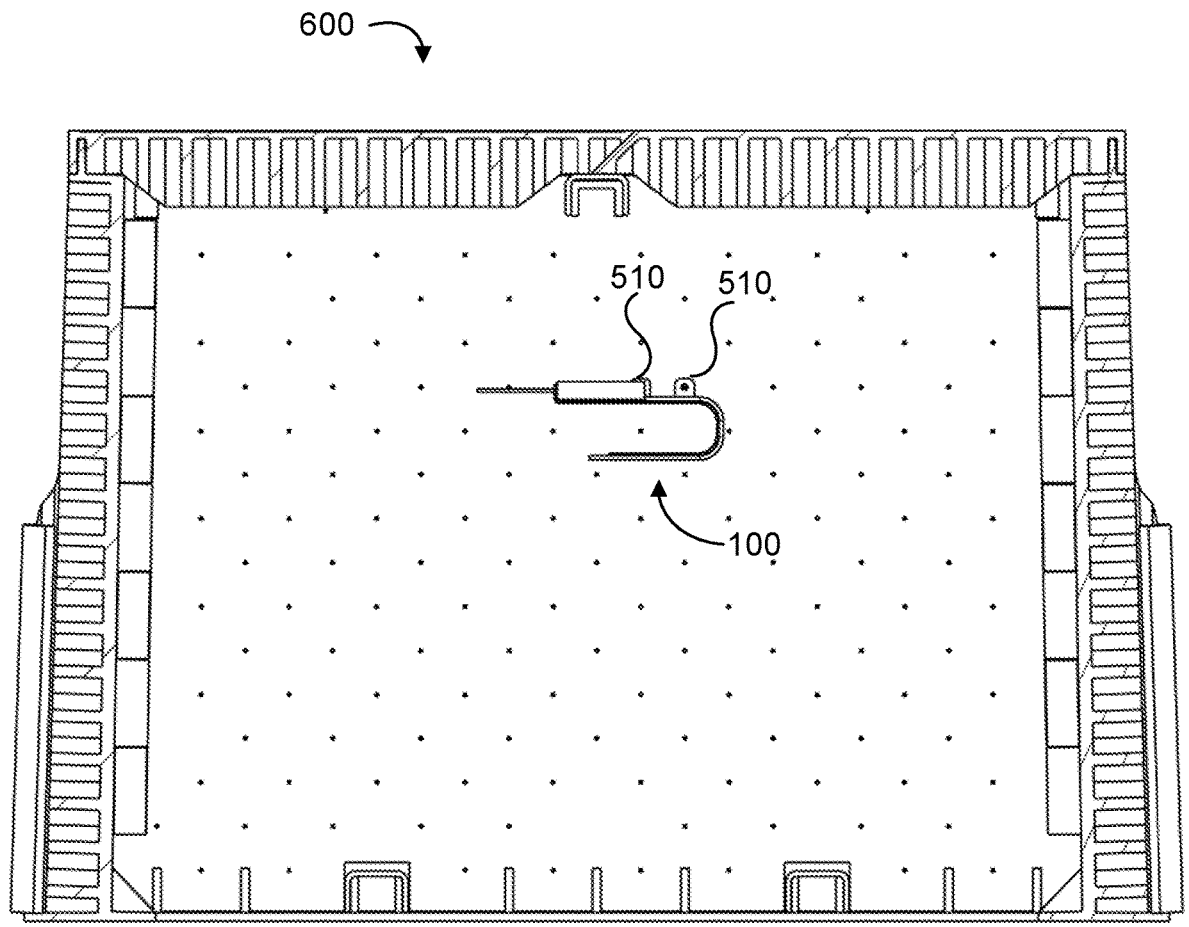
FIG. 6C provides a side view of the inside of the example terminal of FIG. 6A
Figure 8A:
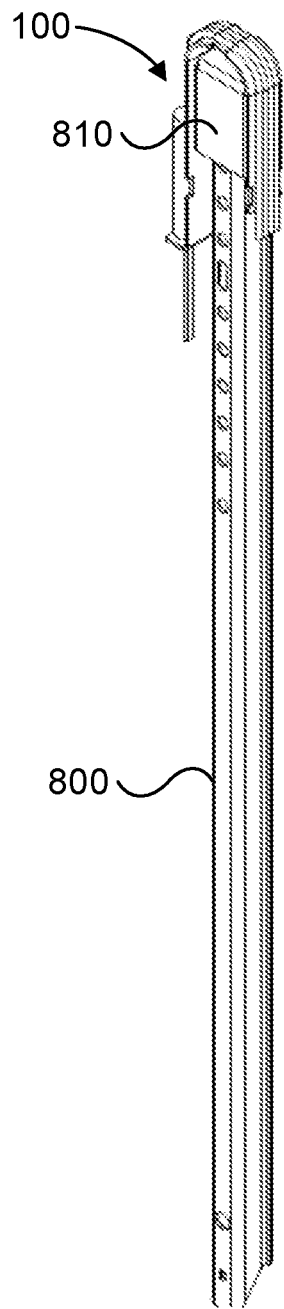
FIG. 8A provides a perspective view of an example terminal, in accordance with the present disclosure.
Figure 8B:
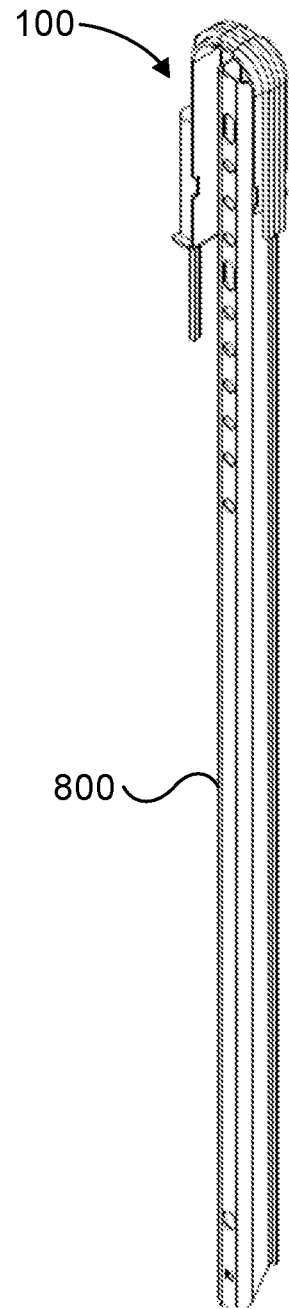
FIG. 8B provides a perspective view of an example terminal, in accordance with the present disclosure.

The flexible cable mounting system 100 can be disposed at and/or within a terminal. For example, as illustrated in FIGS. 6A-6C, the flexible cable mounting system 100 can be disposed within a vault 600. The flexible cable mounting system can be attached to an interior wall of the vault via the brackets 510 and can guide cable routed within the vault 600. Alternatively, or in addition, the flexible cable mounting system 100 can be disposed within a pedestal 700. For example, as illustrated in FIGS. 7A and 7B the flexible cable mounting system 100 can be attached to a pedestal post 710, via the brackets 510, at a location within the pedestal 700 and can guide cable routed within the pedestal 700. Alternatively, or in addition, the flexible cable mounting system 100 can be disposed on a post 800. For example, as illustrated in FIGS. 8A-8D, the flexible cable mounting system 100 can be configured to attach to a post 800 in a variety of configurations. The flexible cable mounting system 100 can be attached to the post 800 with a post bracket 810 (as illustrated in FIG. 8A) or without a post bracket 810 (as illustrated in FIG. 8B). Alternatively, or in addition, the flexible cable mounting system 100 can be configured to attach to the post 800 by screw mounting the flexible cable mounting system 100 to the post 800 (e.g., by screws, bolts, nails, etc., that pass through a hole in the bracket 510 to the post 800).

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"): the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A flexible cable mounting system comprising:
an elongated surface configured to guide one or more cables generally parallel along the elongated surface, the elongated surface comprising:
   a first substantially rigid portion having a generally linear shape and comprising one or more integrated brackets comprising a hole configured to attach the first substantially rigid portion to an optical fiber enclosure;
   a second substantially rigid portion having a generally linear shape;
   a third portion disposed between the first portion and the second portion, wherein the third portion is flexible along its entire length and configured to vary an angle formed between the first portion relative to the second portion by generally forming an arc therebetween and to support the one or more cables against a surface of the third portion, and wherein the third portion is flexibly configured to vary the angle formed between the first portion relative to the second portion by generally forming a single arc therebetween, and
   at least one pair of notches disposed opposite one another along exterior edges of the elongated surface.

2. The system of claim 1, wherein the third portion is flexibly configured to vary the angle between the first portion and the second portion from 0 degrees to 180 degrees and any angle therebetween.

3. The system of claim 1, wherein the third portion further comprises:
   a first flexible portion configured to flexibly bend between a generally linear profile and a 90-degree arc profile and any degree arc profile therebetween;
   a second flexible portion configured to flexibly bend between a generally linear profile and a 90-degree arc profile and any degree arc profile therebetween; and
   a connecting portion having a generally linear profile, wherein the connecting portion is disposed between the first flexible portion and the second flexible portion.

4. The system of claim 1 further comprising:
   a first plurality of notches disposed along a first exterior edge of the elongated surface; and
   a second plurality of notches disposed along a second exterior edge of the elongated surface,
   wherein the first exterior edge is an opposite side to the second exterior edge, and
   wherein the first plurality of notches mirrors the second plurality of notches along a parallel centerline as between the first exterior edge and the second exterior edge.

5. A flexible cable mounting system comprising:
one or more brackets comprising a hole-configured to attach the flexible mounting cable system to an optical fiber enclosure;
an elongated surface affixed to the one or more brackets and configured to guide one or more cables generally parallel along the elongated surface, the elongated surface comprising:
   a first substantially rigid portion having a generally linear shape;
   a second substantially rigid portion having a generally linear shape; and
   a third portion disposed between the first portion and the second portion, wherein the third portion is flexible and configured to vary an angle formed between the first portion relative to the second portion and to continuously support the one or more cables against a surface of the third portion, and wherein the third portion is flexibly configured to vary the angle formed between the first portion relative to the second portion by generally forming a single arc therebetween, the third portion comprising:
      a first flexible portion configured to flexibly bend along its entire length between a generally linear profile and a 90-degree arc profile and any degree arc profile therebetween;
      a second flexible portion configured to flexibly bend along its entire length between a generally linear profile and a 90-degree arc profile and any degree arc profile therebetween; and
      a connecting portion having a generally linear profile, wherein the connecting portion is disposed between the first flexible portion and the second flexible portion.

6. The system of claim 5, wherein the third portion is flexibly configured to vary the angle between the first portion and the second portion from 0 degrees to 180 degrees and any angle therebetween.

7. The system of claim 5 further comprising:
   a first plurality of notches disposed along a first exterior edge of the elongated surface; and
   a second plurality of notches disposed along a second exterior edge of the elongated surface,
   wherein the first exterior edge is an opposite side to the second exterior edge, and
   wherein the first plurality of notches mirrors the second plurality of notches along a parallel centerline as between the first exterior edge and the second exterior edge.

8. A flexible cable mounting system comprising:
one or more brackets comprising a hole configured to attach the flexible mounting cable system to an optical fiber enclosure;
an elongated surface affixed to the one or more brackets and configured to guide one or more cables generally parallel along the elongated surface, the elongated surface comprising:
   a first substantially rigid portion having a generally linear shape;
   a second substantially rigid portion having a generally linear shape; and
   a third portion disposed between the first portion and the second portion, wherein the third portion is flexible along its entire length and configured to vary an angle formed between the first portion relative to the second portion by generally forming an arc therebetween and to continuously support the one or more cables against a surface of the third portion, and wherein the third portion is flexibly configured to vary the angle formed between the first portion relative to the second portion by generally forming an arc therebetween.

9. The system of claim 8, wherein the third portion further comprises:
   a first flexible portion configured to flexibly bend along its entire length between a generally linear profile and a 90-degree arc profile and any degree arc profile therebetween;

a second flexible portion configured to flexibly bend along its entire length between a generally linear profile and a 90-degree arc profile and any degree arc profile therebetween; and
a connecting portion having a generally linear profile, wherein the connecting portion is disposed between the first flexible portion and the second flexible portion.

* * * * *